May 6, 1930.  J. P. COOPER  1,757,448
FOOD CONTAINER
Filed July 11, 1928
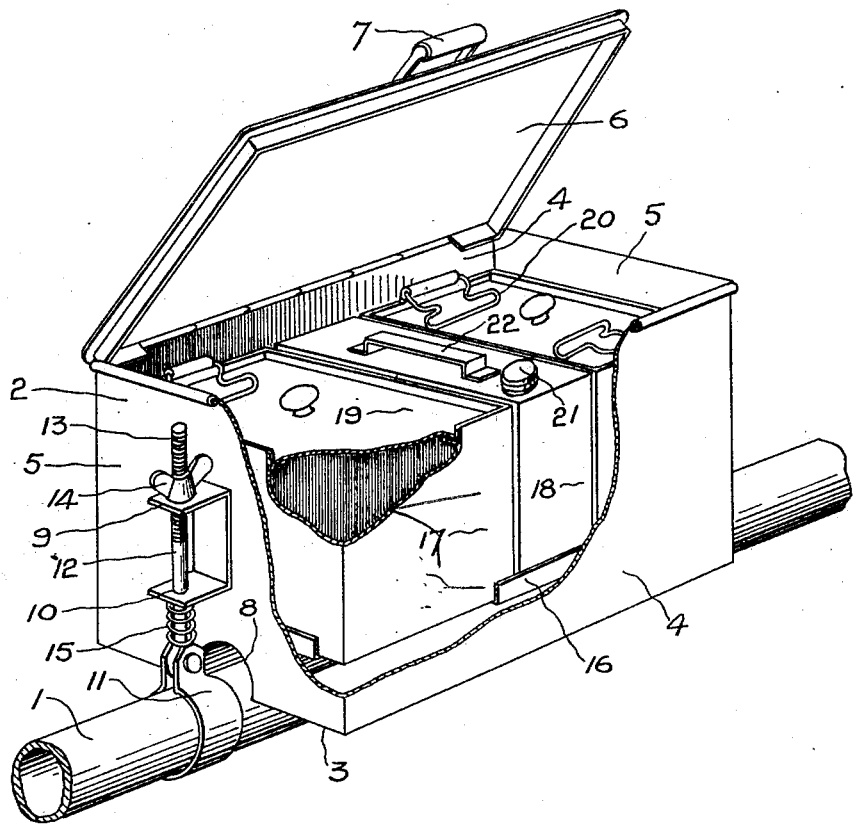
INVENTOR
JOHN PIRIE COOPER
BY
ATTORNEYS Patented May 6, 1930

1,757,448

UNITED STATES PATENT OFFICE

JOHN PIRIE COOPER, OF TOFINO, BRITISH COLUMBIA, CANADA

FOOD CONTAINER

Application filed July 11, 1928. Serial No. 291,914.

My invention relates to improvements in food containers which are particularly adapted for use on motor cars or boats which have for their particular object the utilization of the heat of the exhaust from the engine for either cooking food or imparting a suitable heat thereto. A further object is to provide means whereby the heat transmitted from the exhaust pipe of the engine to the container may be controlled by varying the distance between the two.

The invention consists essentially of a container having lugs at its opposite ends and rods extending through said lugs for supporting the container above an engine exhaust pipe and means whereby the container is adjustable along the length of the rods, so that the height of the container above the pipe may be varied to provide the internal temperature desired therein, as will be more fully described in the following specification and shown in the accompanying drawings, in which:—

The drawing is a general view of the invention with a portion cut away to show the manner in which it is adapted to be fitted.

The numeral 1 indicates the exhaust pipe from an internal combustion engine. The numeral 2 indicates generally a container having a bottom wall 3, front and rear walls 4, end walls 5 and a hinged cover 6 fitted with a suitable lifting handle 7. The bottom wall 3 is provided with a semi-cylindrical longitudinal recess 8, of a similar diameter to that of the exhaust pipe 1, which is disposed in any position that may be deemed advisable to provide for the convenient mounting of the device. Secured to the end walls 5 of the container are lugs 9 which are apertured as at 10.

A pair of clips 11 are fitted about the exhaust pipe 1 the outer ends of which support a pair of eye bolts 12, which bolts slidably extend through the apertures 10 of the lugs 9. The upper extremities of the bolts 12 are threaded as at 13 and are fitted with wing nuts 14 for the purpose of adjusting the container 2 against the compression of springs 15 carried by the bolts between the clips 11 and the lugs 9, so that the container may be set at any desired height above the exhaust pipe 1. Fitted to the walls 4 and 5 within the container 2, adjacent its bottom wall are angles 16, which serve as a support for a plurality of utensils generally indicated by the numerals 17 and 18. The utensils 17 and 18 may be of any desired size and shape, those indicated by the numeral 17 serving as food holders and being preferably fitted with a loose cover 19 and folding handles 20, and the utensil 18 being fitted with a filler cap 21 and a rigid handle 22 for use as a kettle.

Having thus described the several parts of my invention I will now brefly explain its use.

Food is placed in the utensils 17 and any desired beverage in the utensil 18 and the hinged cover 6 of the container 2 is closed down. If it is desired to keep the foodstuffs at a moderate temperature, the container 2 is left in the position shown in the drawing, but if a relatively high temperature is desired, the wing nuts 14 are screwed down upon the bolts 12 to force the container down closer to the exhaust pipe 1.

If it is desired to cook the foods, the container is moved downwards along the bolts still further until the semi-cylindrical recess 8 of the container substantially encloses the upper half of the exhaust pipe 1, thus enabling the total heat from that part of the pipe which is adjacent the container to be effectively employed for cooking purposes.

What I claim as my invention is:

1. The combination of an exhaust pipe, container supporting members secured to said pipe and extending upwardly therefrom, a container having projections slidably receiving said members therethrough, springs surrounding said members between the exhaust pipe and said projections and serving to resiliently support said container and means for adjusting the container downwardly against the resistance of said springs.

2. The combination of an exhaust pipe, bolts secured to said pipe and extending upwardly therefrom, a container provided with projections slidably receiving said bolts therethrough, springs encircling said bolts between the exhaust pipe and the projections and serving to resiliently support the latter and nuts threaded on the bolts above the projections and engageable with the latter to adjust the container in the direction of the exhaust pipe and against the resistance of said springs.

3. The combination of an exhaust pipe, a pair of clips embracing said pipe and spaced apart longitudinally thereof, a pair of bolts having their lower ends pivotally secured to said clips, a container positioned above the exhaust pipe between said clips and provided with apertured lugs slidably receiving the bolts therethrough, springs encircling said bolts between said clips and said lugs and serving to resiliently support the latter and nuts threaded on said bolts above said lugs and engageable with the latter, said nuts being adjustable on the bolts to force the container toward the exhaust pipe against the resistance of said spring.

Dated at Port Alberni, B. C., this 3rd day of July, 1928.

JOHN PIRIE COOPER.